United States Patent [19]

Zenhausern et al.

[11] Patent Number: 4,840,761
[45] Date of Patent: Jun. 20, 1989

[54] PROCESS FOR MAKING ENCAPSULATED ANCHOR RUNG

[75] Inventors: Heinrich Zenhausern, Birmensdorferstrasse 134A CH-8902, Urdorf/Zurich, Switzerland; Robert Weber, Oakville, Canada

[73] Assignee: Heinrich Zenhausern, Urdorf/Zurich, Switzerland

[21] Appl. No.: 16,870

[22] Filed: Feb. 20, 1987

[30] Foreign Application Priority Data

Apr. 8, 1986 [CA] Canada ................................. 506119

[51] Int. Cl.⁴ .............................................. B29C 45/14
[52] U.S. Cl. ..................... 264/254; 264/263; 264/274; 425/116; 425/120; 425/126.1; 425/129.1
[58] Field of Search ............... 264/254, 263, 251, 247, 264/268, 274; 425/116, 120, 126 R, 129 R

[56] References Cited

U.S. PATENT DOCUMENTS

| | | | |
|---|---|---|---|
| 3,592,887 | 2/1969 | Edwards | 425/129.1 |
| 3,849,220 | 11/1974 | Suzuki et al. | 264/268 X |
| 4,373,113 | 2/1983 | Winkler et al. | 264/254 X |

*Primary Examiner*—Jan H. Silbaugh
*Assistant Examiner*—Kelley M. Sidwell
*Attorney, Agent, or Firm*—James D. Fornari; Ivor M. Hughes

[57] ABSTRACT

A climbing rung for anchoring to the wall of a manhole shaft. The climbing rung has a generally U-shaped core of two parallel legs spaced apart by a central tread. Each leg is sheathed in a pre-formed protective sleeve, closed at one end, by inserting the leg into the mouth of the sleeve. An injection moulded protective coating is bonded to the core of the tread and the core of each leg, extending to proximate the mouth of each pre-formed sleeve when a leg is sheathed therein, forming a sealing interface proximate the annular lip circumferentially defining the mouth of each sleeve. A method includes gripping the climbing rung only proximate the pre-formed protective sleeves when both legs are sheathed therein, so as to permit positioning the core of the tread and legs, extending only to proximate the mouth of each pre-formed protective sleeve, in an injection moulded cavity radially spaced equidistant the surface of the mould cavity. Advantageously, positioning pins inside the injection mould cavity for radially spacing the core of the climbing rung from the surface of the mould cavity are thereby not required. The method also includes alternatively gripping at least two oppositely spaced portions of the core of the climbing rung and alternately coating the portion of the climbing rung opposite the end which is being gripped.

5 Claims, 5 Drawing Sheets

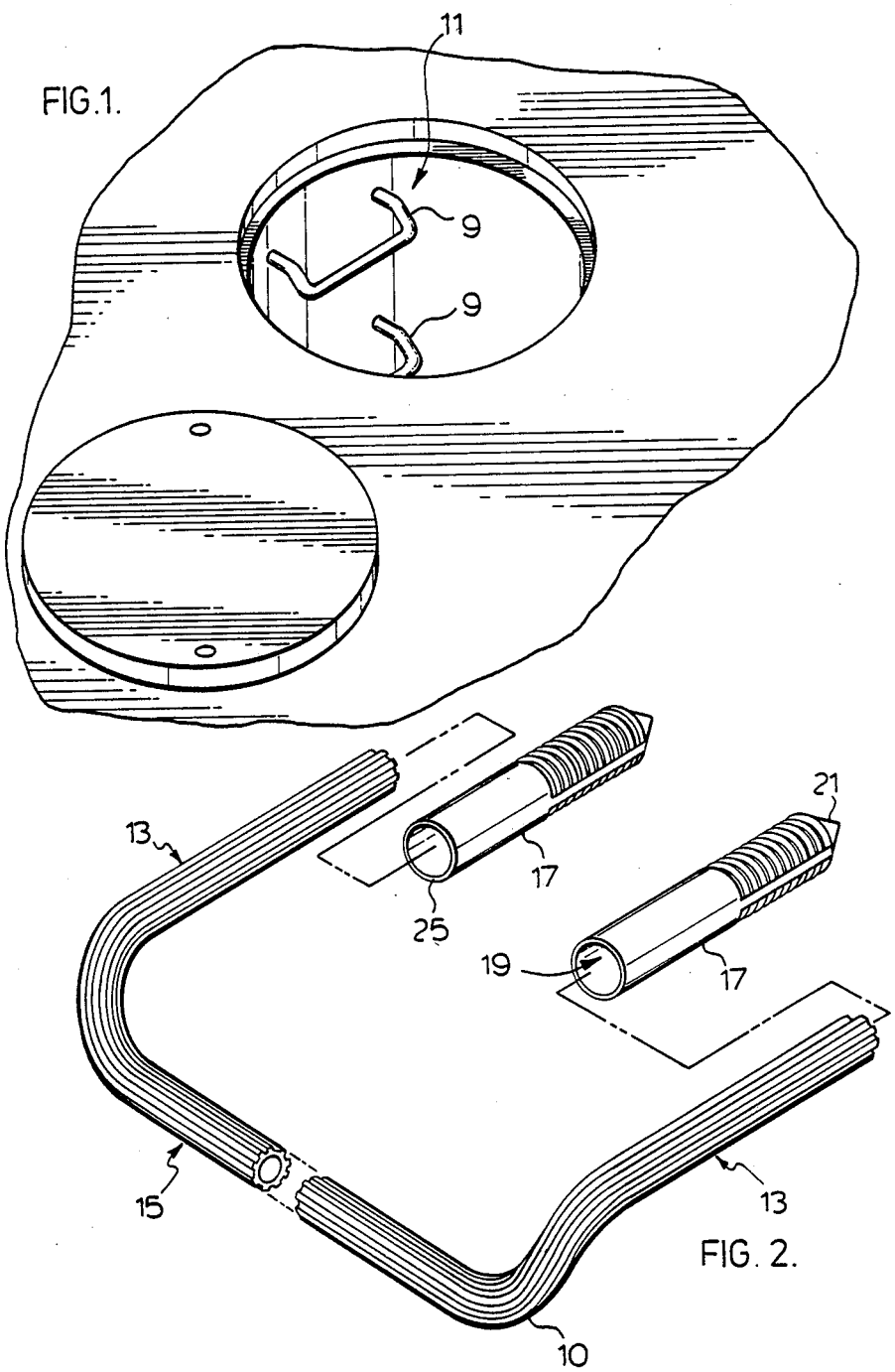

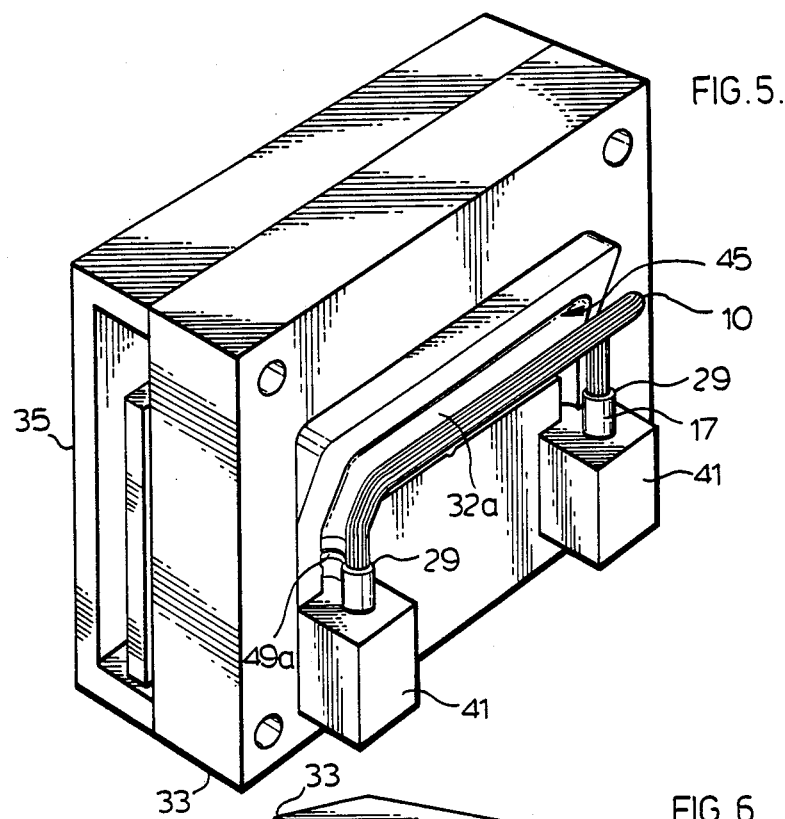
FIG. 5.
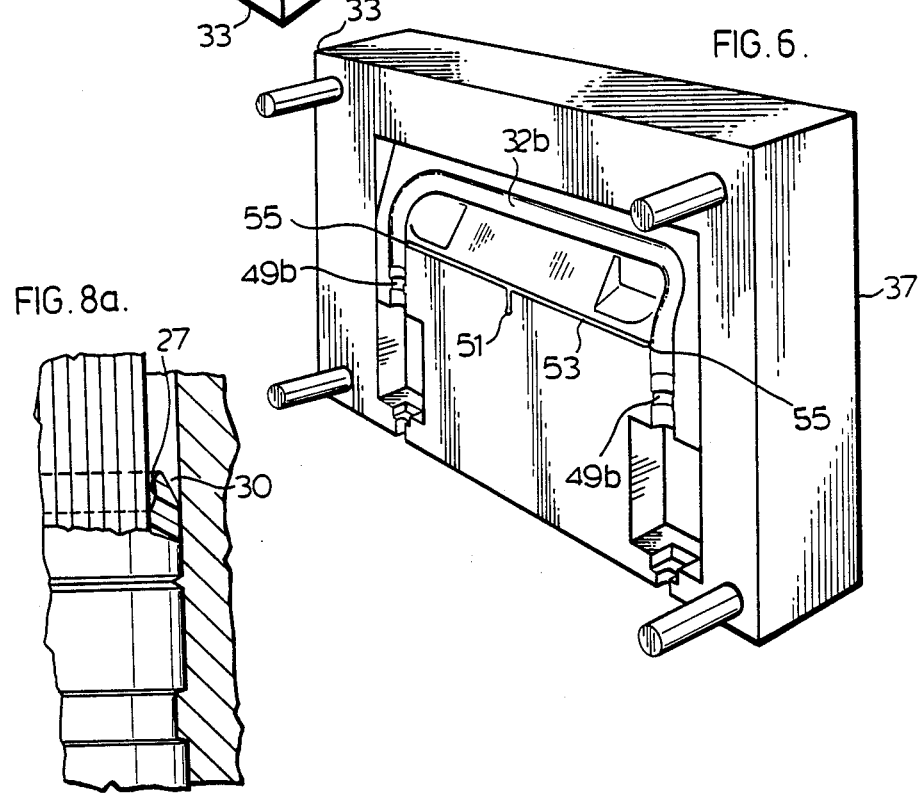
FIG. 6.
FIG. 8a.

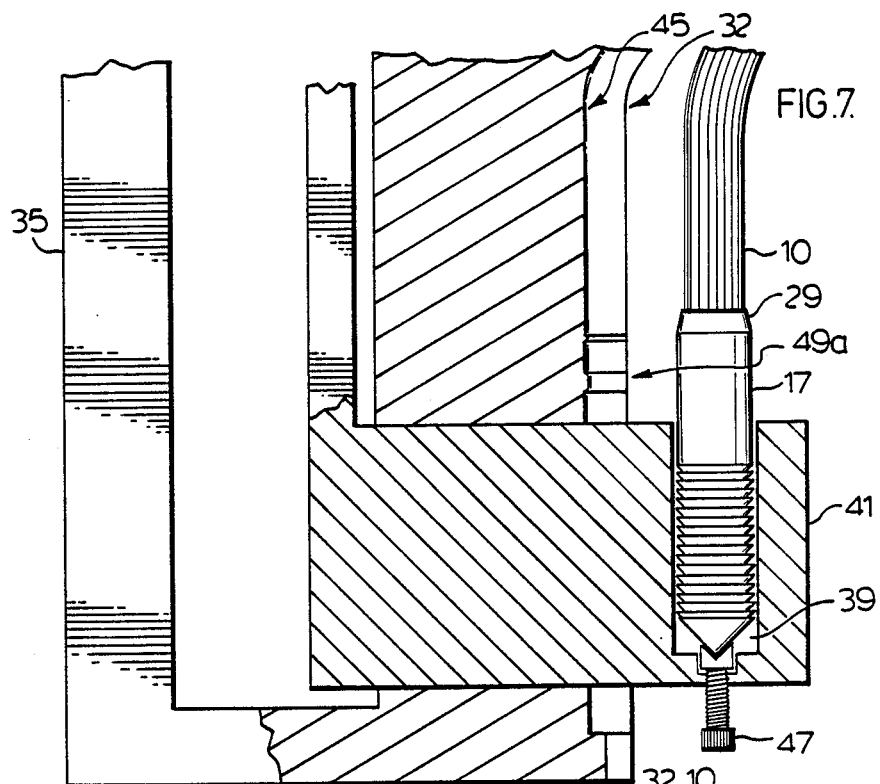
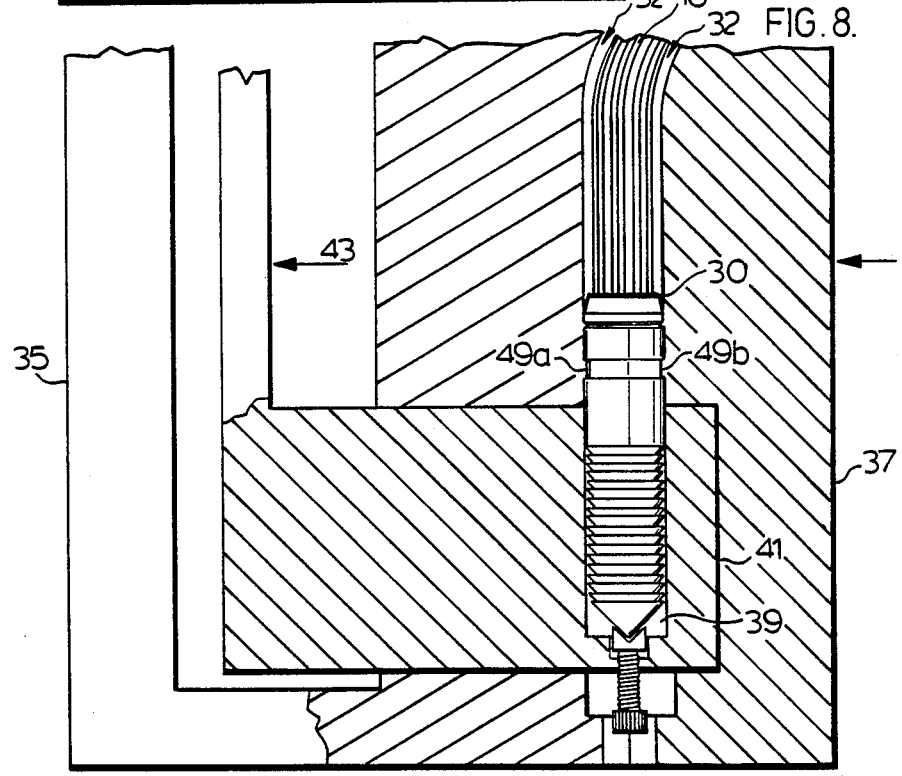

PROCESS FOR MAKING ENCAPSULATED ANCHOR RUNG

FIELD OF INVENTION

The present invention relates to an improved climbing rung encapsulated in a corrosion resistant material for anchoring to the wall of a manhole shaft and an improved method of making same.

BACKGROUND OF INVENTION

Climbing rungs for anchoring to the wall surface of a manhole shaft are known, employing a generally U-shaped aluminum or steel rung consisting of two parallel legs for anchoring on the wall spaced apart by a central tread. The two parallel anchoring legs are to be permanently inserted into receptive bore holes in the wall.

It is recognized by those skilled in the art that a manhold shaft is a corrosive environment presenting the risk of rusting or corrosion of steel or aluminum climbing rungs when they are anchored into a wall. Accordingly a variety of coatings and combinations thereof have been proposed for protecting the aluminum or steel 'core' of the step against corrosion. For example the 'core' may be sheathed in a pre-formed protective jacket or sleeve open at both ends. A pair of pre-formed protective anchor sleeves, each one sealed at a conically tapered end for insertion into a receptive bore hole in the wall are adapted to fit over the ends of the anchoring legs and overlap the protective jacket sheathing the 'core' of the climbing rung. Exposure of the 'core' to corrosive substances is thereby mitigated. However a perfect seal is not achieved —use of the climbing rung will result in flexion and vibration spreading corrosive substances along the cylindrical seams between the anchor sleeve, protective jackert or sleeve and 'core'. The resulting rust and corrosion underneath the anchor sleeves and protective jacket is not visible to inspection.

Many building codes now require that protective coatings provide a bond encapsulating the 'core' of the climbing rung sufficient that current will not be conducted from the 'core' through the protective coating to electrical ground. The response to the need for a more effective means of sealing the 'core' has been to encapsulate it in a corrosion resistant material such as recovered battery case material by means of an injection moulding process. According to this process the entire climbing rung is placed in the cavity of a mould body and molten polyethylene or the like is injected into the mould cavity. Usually the 'core' is hollow inside. It is therefore necessary to plug the ends of the 'core' to prevent the molten polyethylene from being injected into the 'core'. Since the contact between the climbing rung and the side of the mould cavity will preclude the injected polyethylene from forming a coat of uniform thickness it is necessary to support the climbing rung centrally in the mould cavity. To this end, typically pins are provided which project into the mould cavity to support and evenly space the climbing rung from the surface of the mould cavity. After the climbing rung is ejected from the mould body, holes are left in the coating proximate the site where the support pins have contacted the 'core', which must be detected and filled. Plugging the ends of the 'core' and filling the pin holes adds to the cost of, and time needed, for production. In another embodiment it has been taught to provide support pins that 'float' in bore holes in the body of the mould under air pressure less than the injection pressure and which normally project into the mould cavity. When the ejection half and the injection half of the mould are joined, the support pins extend into the mould cavity to centrally support the climbing rung. As the injection pressure becomes greater than the air presssure 'floating' the support pins in the bore holes, the pins retract from the mould cavity into the body of the mould. Since polyethylene can leak into the bore holes under pressure, the fit of the support pins in the bore holes requires a tolerance of 0:0. Moulds having such tolerances are expensive to manufacture. In practice the pins get stuck and fail to retract. Therefore a hole may unexpectedly be left in the injection moulded coating which must be detected and filled, resulting in high rejection rates and low productivity. Accordingly, in practice such a system has an extremely low production rate and is prone to failure.

It is therefore an object of this invention to provide an improved climbing rung having a combination of protective coatings sealing the 'core' sufficient that electrical current will not be conducted through the protective coatings to electrical ground.

It is a further object of this invention to provide an improved method of encapsulating the core of a climbing rung in an injection moulding process.

Further and other objects of the invention will be apparent to those skilled in the art from the following Summary of the Invention and Detailed Description of Embodiments thereof.

SUMMARY OF INVENTION

According to one aspect of the invention there is provided an improved climbed rung comprising in combination a generally U-shaped core having two parallel legs spaced apart by a central tread, each leg sheathed in a pre-formed protective sleeve open at one end to receive the leg and sealed at the opposite end for insertion into a receptive bore hole in a wall; and, a protective coating bonded to the climbing rung and pre-formed protective sleeves by means of an injection moulding process, the injection moulded protective coating encapsulating the tread and legs of the climbing rung extending only to proximate the receptive end of each pre-formed protective sleeve melding with the annular lip of each pre-formed protective sleeve proximate the receptive end forming a sealing interface thereat sufficient that electric current will not be conducted, from the core through the protective coating comprising the combination in a sealing interface of a pair of pre-formed protective sleeves and an injection moulded protective coating, to electrical ground.

According to a preferred embodiment of the invention each pre-formed protective sleeve proximate the annular lip of the receptive end thereof is of an inside diameter slightly greater than the outside diameter of the core of each leg so as to provide an annular pocket into which the polyethylene may weep under normal injection pressure. Preferably each pre-formed protective sleeve proximate the outside circumferential portion of the annular lip at the receptive end thereof is slightly angularly tapered radially inward. All that is necessary is that the pre-formed protective sleeve meld with the injection moulded protective coating proximate the annular lip of the respective end thereof in a sealing interface.

According to another aspect of the invention there is provided an improved method of manufacturing a climbing rung in a mould body having an ejection half and an injection half, the climbing rung having a generally U-shaped core of two parallel legs spaced apart by a central tread encapsulated in a protective coating comprising the combination in a sealing interface of a pair of pre-formed protective sleeves and an injection moulded protective coating, the method comprising the steps of (a) sheathing the end of each leg in a pre-formed protective sleeve open at one end to receive the leg; (b) gripping the pre-formed protective sleeves with means for gripping the climbing rung only proximate the end of each leg; (c) positioning with the gripping means the tread and legs of the climbing rung extending only to proximate the receptive end of each pre-formed protective sleeve centrally in a disjointed injection mould cavity; d) closing the ejection half and the injection half of the mould body so as to form the mould cavity enclosing the tread and legs of the climbing rung extending only to proximate the receptive end of each pre-formed protective sleeve, the mould body forming an annular seal at the outside circumference of each pre-formed protective sleeve proximate the receptive end; e) injecting a molten thermoplastic material into the mould cavity whereby the material flows into the entire mould cavity evenly coating the core of the climbing rung and weeping into the interface at the receptive end of each pre-formed sleeve and each leg, whereby the injected thermoplastic material melds with the pre-formed protective sleeves to form a sealing interface.

According to a preferred embodiment of the invention there is provided an improved method of manufacturing a climbing rung in a mould body having an ejection half and an injection half, the climbing rung having a generally U-shaped core of two parallel legs spaced apart by a central tread encapsulated in a protective coating comprising the combination in a sealing interface of a pair of pre-formed protective sleeves and an injection moulded protective coating each sleeve having an annular space between the receptive end of said sleeve and the outside annular circumference of each leg, the method comprising the steps of (a) sheathing the end of each leg in a pre-formed protective sleeve open at one end to receive the leg; (b) gripping the pre-formed protective sleeves with means for gripping the climbing rung only proximate the end of each leg; (c) positioning with the gripping means the tread and legs of the climbing rung extending only to proximate the receptive end of each pre-formed protective sleeve centrally in a disjointed injection mould cavity; (d) closing the ejection half and the injection half of the mould body so as to form the mould cavity enclosing the tread and legs of the climbing rung extending only to proximate the receptive end of each pre-formed protective sleeve, the mould body forming an annular seal at the outside circumference of each pre-formed protective sleeve proximate the receptive end; (e) injecting a molten thermoplastic material into the mould cavity whereby the material flows into the entire mould cavity evenly coating the core of the climbing rung and weeping into the annular space between the receptive end of each pre-formed sleeve and the outside annular circumference of each leg and over the annular lip of the receptive end of each pre-formed sleeve, and whereby the injected thermoplastic material melds with the pre-formed protective sleeves to form a sealing interface.

According to another aspect of the invention there is provided an improved method of manufacturing an encapsulated climbing rung in a mould body having an ejection half and an injection half, the climbing rung having a generally U-shaped core of two parallel legs spaced apart by a central tread encapsulated in a protective coating, the coating including the combination in a sealing interface of (i) a pair of injection moulded protective sleeves encapsulating the portion of each leg extending from the end thereof to a position intermediate the end of each leg and the central tread, and (ii) an injection moulded protective coating encapsulating the tread extending to the sealing interface proximate the annular end of each injection moulded protective sleeve remote from the end of each leg; the method comprising the steps of: (1) gripping with gripping means, alternately one portion and then an oppositely spaced portion of the core of the climbing rung remote a portion of the core to be positioned with the gripping means centrally in an injection mould cavity; by first (b) encapsulating one portion of the core of the climbing rung thus defining an annular encapsulated end thereof when the opposite portion of the climbing rung is gripped by remotely spaced gripping means; (c) then gripping the most recently encapsulated portion of the climbing rung and encapsulating the oppositely spaced portion of the core of the climbing rung, the later encapsulated portion melding in a sealing interface with the annular end of the previously encapsulated portion whereby by alternately gripping at least two oppositely spaced portions of the core of the climbing rung the entire core of the climbing rung is coated in an injection moulding process.

According to one aspect of the invention there is provided an improved method of manufacturing an encapsulated climbing rung in a mould body having an ejection half and an injection half, the climbing rung having a generally U-shaped core of two parallel legs spaced apart by a central tread encapsulated in a protective coating, the coating comprising the combination in a sealing interface of (i) a pair of injection moulded protective sleeves encapsulating the portion of each leg extending from the end thereof to a position intermediate the end of each leg and the central tread, and (ii) an injection moulded protective coating encapsulating the tread extending to the sealing interface proximate annular end of each injection moulded protective sleeve remote from the end of each leg; the method comprising the steps of: (a) gripping the core of the climbing rung with means for gripping the climbing rung only remote the end of each leg; (b) positioning with the gripping means the end of each leg of the climbing rung extending only to proximate the portion of each leg remote the end of each leg centrally in a disjointed injection mould cavity; (c) closing the ejection half and the injection half of the mould body so as to form the mould cavity enclosing the end of each leg of the climbing rung extending only to the portion of each leg remote the end of each leg, the mould body remote the end of each leg forming an annular seal at the outside circumference of the core of each leg of the climbing rung; (d) injecting a molten material such as polyethylene or the like into the mould cavity enclosing the said end portion of each leg of the climbing rung whereby a pair of moulded protective sleeves are formed, each sleeve encapsulating the portion of each leg extending from the end thereof to the annular end of the sleeve at a position intermediate the end of each leg and the central tread;

(e) ejecting the climbing rung comprising the injection moulded protective sleeves from the mould cavity and gripping the injection moulded protective sleeves with gripping means for gripping the climbing rung only proximate the end of each leg; (f) positioning, with the gripping means for gripping the climbing rung only proximate the end of each leg and the tread centrally in an injection mould cavity; (g) closing the ejection half and the injection half of the mould body so as to form the mould cavity enclosing the tread and each leg of the climbing rung extending only to proximate the annular end of each injection moulded protective sleeve, the mould body forming an annular seal at the outside circumference of each injection moulded protective sleeve proximate its annular end; (h) injecting the molten material such as polyethylene or the like into the mould cavity whereby the polyethylene flows into the mould cavity evenly encapsulating the core of the climbing rung comprising the central tread and each leg of the climbing rung extending to the annular end of each injection moulded protective sleeve and melding in a sealing interface with the annular end of each injection moulded protective sleeve.

According to an alternative aspect of the invention there is provided an improved method of manufacturing an encapsulating climbing rung in a mould body having an ejection half and an injection half, the climbing rung having a generally U-shaped core of two parallel legs spaced apart by a central tread encapsulated in a protective coating, the coating comprising the combination in a sealing interface of (i) a pair of injection moulded protective sleeves encapsulating the portion of each leg extending from the end thereof to a position intermediate the end of each leg and the central tread, and (ii) an injection moulded protective coating encapsulating the tread extending to the sealing interface proximate an annular end of each injection moulded protective sleeve remote from the end of each leg; the method comprising the steps of: (a) gripping the core of the climbing rung with means for gripping the climbing rung only proximate the end of each leg; (b) positioning with the gripping means the tread and each leg of the climbing rung extending only to proximate the portion of each leg remote the end of each leg centrally in a disjointed injection mould cavity; (c) closing the ejection half and the injection half of the mould body so as to form the mould cavity enclosing the tread and each leg of the climbing rung extending only to proximate the portion of each leg remote the end of each leg, the mould body forming an annular seal at the outside circumference of the core of each leg remote the end of each leg; (d) injecting a molten material such as polyethylene or the like into the mould cavity whereby the polyethylene flows into the mould cavity evenly encapsulating the core of the climbing rung comprising the central tread and the portion of each leg remote its end; (e) ejecting the climbing rung comprising the encapsulated tread and the portion of each leg remote its end from the mould cavity and gripping the encapsulated portion of the climbing rung with gripping means for gripping the climbing rung only remote the end of each leg; (f) positioning, with gripping means for gripping the climbing rung only remote the end of each leg, the end of each leg of the climbing rung extending only to proximate the portion of each leg remote the end of each leg and proximate the injection moulded coating of the tread and the portion of each leg remote the end of each leg centrally in an injection mould cavity; (g) closing the ejection half and the injection half of the mould body so as to form the mould cavity enclosing the end of each leg of the climbing rung extending only to proximate the portion of each leg remote the end of each leg, the mould body forming an annular seal at the outside circumference of the portion of the injection moulded coating remote the end of each leg; (h) injecting the molten material such as polyethylene or the like into the mould cavity enclosing the said end portion of each leg of the climbing rung whereby a pair of moulded protective sleeves are formed, each sleeve encapsulating the portion of each leg extending from the end thereof to the annular end of the coating remote the end of each leg and melding in a sealing interface with the annular end of the coating encapsulating each leg remote its end.

The invention will now be illustrated with reference to the following drawings of an embodiment of the invention.

DESCRIPTION OF DRAWINGS

FIG. 1 is a perspective view of climbing rungs anchored in a manhole shaft.

FIG. 2 is a perspective view of a portion of a climbing rung.

FIG. 5 is a perspective view of the ejection side of a mould body including means for gripping the legs of a climbing rung only proximate the ends.

FIG. 6 is a perspective view of the injection side of the mould body seen in FIG. 5.

FIG. 7 is a close-up side view of the means for gripping the legs of a climbing rung only proximate the ends seen in FIG. 5, in an ejection position.

FIG. 8 is a view of the gripping means seen in FIG. 7 in a retracted position suitable for an injection phase.

FIG. 8A is a close-up view of the annular space formed between the surface of the mold cavity and the outside circumferential portion of the annular lip.

DETAILED DESCRIPTION OF A PREFERRED EMBODIMENT OF THE INVENTION

With reference to FIG. 1 there is shown a plurality of encapsulated climbing rungs 9 anchored in a wall 11 of a manhold shaft.

Figure 3:
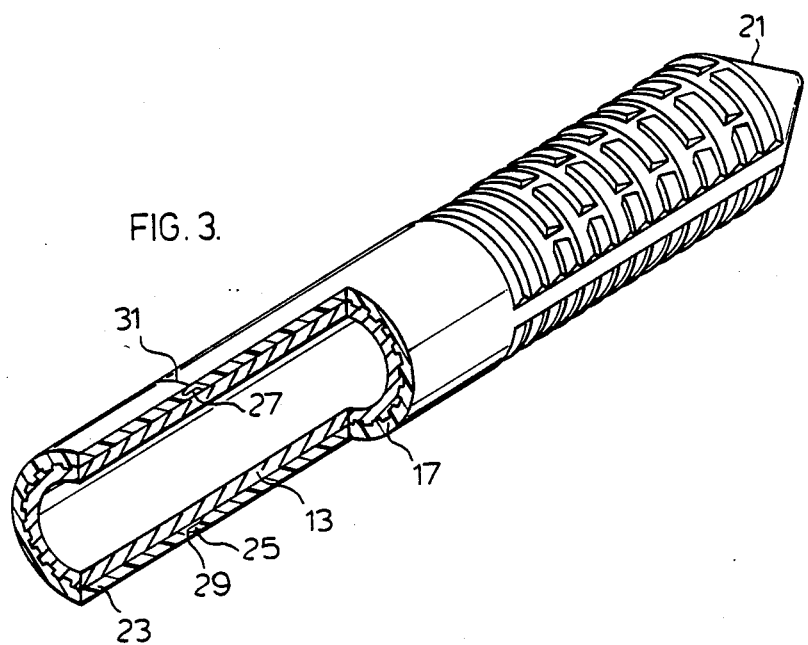
FIG. 3 is an anchoring leg of a climbing rung partially cut away in a partial view of a longitudinal section and a cross-section.
Figure 4:
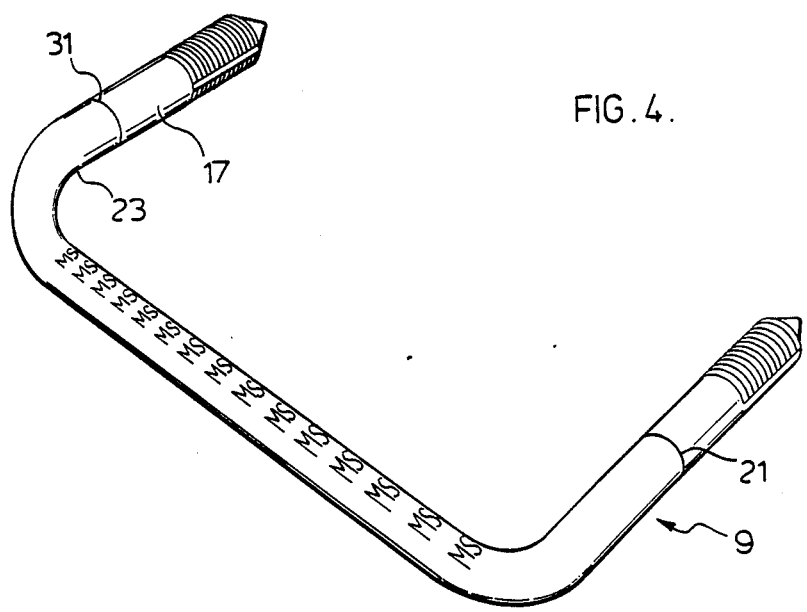
FIG. 4 is a perspective view of a climbing rung encapsulated in the combination in a sealing interface of pre-formed protective sleeves and an injection moulded protective coating.

Referring to FIGS. 2, 3 and 4 there is shown a climbing rung 9 having a core 10 (seen in FIG. 2) comprising two parallel core legs 13 spaced apart by a central tread 15. Each core leg 13 is sheathed in a pre-formed protective sleeve 17 open at one receptive end 19 to receive the leg 13. The opposite end is sealed 21, preferably conically tapered so as to be suitable for insertion into a receptive bore hole in the shaft wall 11. An injection moulded protective coating 23 is bonded to the core 10 of the climbing rung comprising the central tread 15 and core legs 13, and extends to proximate the receptive end 19 of each pre-formed protective sleeve 17. Referring to FIG. 3 and 8A, the annular lip 25 of the respective end 19 of each sleeve 17 is of an inside diameter slightly greater than the outside diameter of each core leg 13 so as to provide an annular pocket 27 proximate the inside circumference of the annular lip 25 into which the injection moulded protective coating 23 may weep under normal injection pressure. Preferably the annular lip 25 proximate the outside circumferential portion 29 thereof is slightly angularly tapered radially inward so as to provide an annular space 30 (best seen in FIG. 8) between the surface of a mould cavity 32 and the outside circumferential portion 29 of the annular lip 25, into which the polyethylene may weep under normal injection pressure. All that is necessary is that the annular lip 25 of each sleeve 17 and the injection moulded protective coating 23 meld together to form a sealing interface 31 (best seen in FIG. 3) proximate the annular lip 25.

With reference to FIGS. 2, 5, 6, 7 and 8 there is shown a method of manufacturing an encapsulated climbing rung 9, comprising the following steps: Each core leg 13 of the climbing rung core 10 is sheathed in a pre-formed protective sleeve 17 by insertng the core leg 13 into the receptive end 19 of the sleeve 17. Referring to FIGS. 5 and 6, a mould body 33 comprising an ejection half 35 and an injection half 37, symmetrically opposed and conjoinable one to the other is provided. The ejection half 35 of the mould body 33 has a receptive bore 39 (best seen in FIGS. 7 and 8), the receptive bore 39 for receiving the sleeves 17 when the core legs 13 are sheathed therein. The receptive bore 39 is carried by an ejection system 41 that is capable of retracting 43. After the unfinished rung 10, 13 is placed in the receptive bores 39, the ejection system 41 retracts 43 into the ejection half 35 of the mould body 33 so as to evenly space the core 10 from the surface 45 of the ejection side of the mould cavity 32a. A locating pin 47 (best seen in FIGS. 7 and 8) is provided at the bottom of each receptive bore 39 so as to permit height adjustment of each sleeve 17 in relation to the two sealing collars 49. The sealing collars 49 each comprise two halves 49a, 49b, one half 49a seated at the base of the ejection half of the mould cavity 32a; the other half 49b seated at the base of the injection half of the mould cavity 32b.

After the ejection system 41 has retracted 43 into the ejection half 35 of the mould body 33 the symmetrically opposed injection half 37 of the mould 33 is joined therewith so as to form a mould cavity 32 comprised of the ejection side of the mould cavity 32a and the injection side of the mould cavity 32b, thereby positioning the tread 15 and core legs 13 extending only to proximate the annular lip 25 of each sleeve 17 radially equidistant to the surface 45 of the mould cavity 32. In the closed position of the mould 33, best seen in FIG. 8, the two sealing collars 49 form an annular seal about the outside circumference of each sleeve 17 proximate the receptive ends 19. Preferably the sealing collars 49 are positioned slightly below the annular lip 25 of each sleeve 17.

Referring to FIG. 6 and 8A, the injection half 37 of the mould body 33 is provided with a sprue 51 supplying molten polyethylene or the like to a runner 53. The molten polyethylene enters the mould cavity 32 through the runner gates 55, flowing into the entire mould cavity 32 evenly coating the core 10 and weeping into the annular pocket 27 and annular space 30, thereby melding with each pre-formed protective sleeve 17 proximate the annular lip 25 thereof to form a sealing interface 31. The mould halves 35,37 may then separate; the ejection system 41 will eject from the ejection half 35 of the mould, and an operator may then lift the completed rung up from out of the receptive bores 39.

Figure 9:
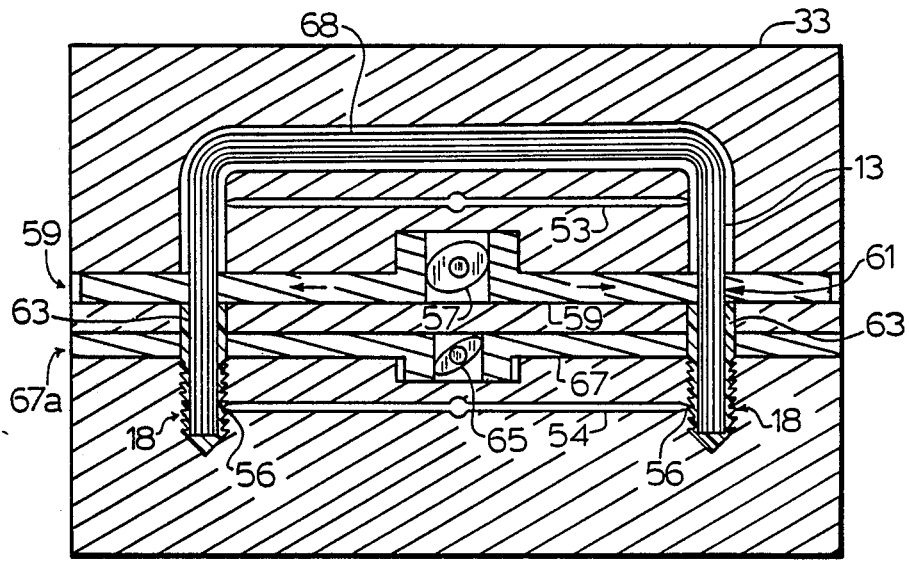
FIG. 9 is frontal schematic view of an alternative embodiment of the mould body seen in FIGS. 5, 6, 7 and 8, and a mould cavity therein containing a climbing rung, shown in one position for gripping the climbing rung remote the end of each leg.
Figure 10:
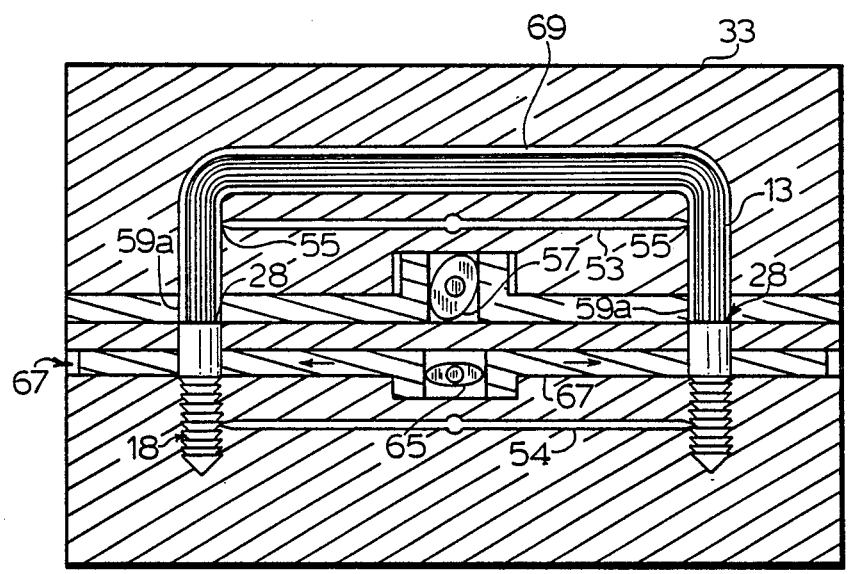
FIG. 10 is a frontal schematic view of the mould body shown in FIG. 9, shown in an alternative position for gripping the climbing rung proximate a pair of protective sleeves formed by injection moulding at the end of each leg.

With reference to FIGS. 9 and 10 there is shown an alternative method of manufacturing the encapsulated climbing rung 9 without using the pre-formed protective sleeves 17. There is also shown an alternative embodiment of the mould body 33 for use in manufacturing the encapsulated climbing rung 9 according to the alternative method. The mould body 33 is provided with an upper runner 53 and a lower runner 54. The lower runner comprises runner gates 56. An upper cam 57 is capable of reciprocating the position of an upper ejection system 59. In FIG. 9, the upper ejection system 59 is shown gripping the circumference of each core leg 13 of the climbing rung. An annular seal 61 is formed at the circumference of each core leg 13 when it is gripped by the ejection system 59, thereby sealing the lower portion 63 of the mould cavity 32. At this stage, molten polyethylene flows through the lower runner 54 and enters the lower portion 63 of the mould cavity 32 through the runner gates 56. Injection moulded sleeves 18 are thereby formed, encapsulating the end of each core leg 13. The upper cam 17 is then rotated to reciprocate the upper ejection system 59 to a position flush with the surface 45 of the mould cavity 32, best seen as position 59a in FIG. 10. A lower cam 65 is capable of reciprocating the position of a lower ejection system 67. In FIG. 9 the lower ejection system 67 is shown retracted to a position 67a flush with the surface of the lower portion 63 of the mould cavity 32.

Referring to FIG. 10, the lower ejection system 67 is shown gripping the sleeves 18 after the sleeves 18 have been injection moulded. At this second stage molten polyethylene flows through the upper runner 53 and enters the upper portion 69 of the mould cavity 32 through the runner gates 55. The molten polyethylene flows into the entire upper cavity 69, evenly coating the central tread 15 and the portion of each core leg 13 extending to proximate the annular lip 28 of the sleeves 18, melding with each sleeve 18 proximate its annular lip 28 to form a sealing interface 31 (best seen in FIG. 3). The lower cam 65 is then rotated to reciprocate the lower ejection system 67 to a retracted position 67a (best seen in FIG. 9). The two sections 35,37 (best seen in FIGS. 5 and 6) of the mould body 33 may then be separated and the encapsulated climbing rung 9 removed from the mould.

It will be appreciated that the core 10 of the climbing rung 9 may thereby be centrally positioned in the mould cavity 32 without gripping the rung 9 by a pre-formed coating or sleeve 17 —advantageously less handling of the rung 9 in its manufacture is thereby achieved.

In another embodiment the steps may be reversed, whereby the injection moulded protective sleeves 28 are formed last. All that is necessary is that the core 10 of the climbing rung be gripped at a position opposite the portion of the climbing rung to be positioned in the mould cavity 63,69.

As many changes can be made to the embodiment of the invention without departing from the scope of the invention, it is intended that all material be considered as illustrative of the invention and not in a limiting sense.

The embodiments of the invention in which an exclusive property or privilege is claimed are as follows:

1. An improved method of manufacturing a climbing rung in a mould body having an ejection half and an injection half, the climbing rung having a generally U-shaped core of two parallel legs spaced apart by a central tread encapsulated in a protective coating comprising the combination in a sealing interface of a pair of pre-formed protective sleves and an injection moulded protective coating, the method comprising the steps of (a) sheathing the end of each leg in a pre-formed protective sleeve open at one end to receive the leg; (b) gripping the preformed protective sleeves with means for gripping the climbing rung only proximate the end of each leg; (c) positioning with the gripping means the tread and legs of the climbing rung extending only to proximate the receptive end of each pre-formed protective sleeve centrally in a disjointed injection mould cavity; (d) closing the ejection half and the injection half of the mould body so as to form the mould cavity enclosing the tread and legs of the climbing rung extending only to proximate the receptive end of each pre-formed protective sleeve, the mould body forming an annular seal at the outside circumference of each pre-formed protective sleeve proximate the receptive end; (e) injecting a molten thermoplastic material into the mould cavity whereby the material flows into the entire mould cavity evenly coating the core of the climbing rung and weeping into the interface at the receptive end of each pre-formed sleeve and each leg, whereby the injected thermoplastic material melds with the pre-formed protective sleeves to form a sealing interface.

2. An improved method of manufacturing a climbing rung in a mould body having an ejection half and an injection half, the climbing rung having a generally U-shaped core of two parallel legs spaced apart by a central tread encapsulated n a protective coating comprising the combination in a sealing interface of a pair of pre-formed protective sleeves and an injection moulded protective coating each sleeve having an annular space between the receptive end of said sleeve and the outside annular circumference of each leg, the method comprising the steps of (a) sheathing the end of each leg in a pre-formed protective sleeve open at one end to receive the leg; (b) gripping the pre-formed protective sleeves with means for gripping the climbing rung only proximate the end of each leg; (c) positioning with the gripping means the tread and legs of the climbing rung extending only to proximate the receptive end of each preformed protective sleeve centrally in a disjointed injection mould cavity; (d) closing the ejection half and the injection half of the mould body so as to form the mould cavity enclosing the tread and legs of the climbing rung exceeding only to proximate the receptive end of each pre-formed protective sleeve, the mould body forming an annular seal at the outside circumference of each pre-formed sleeve proximate the receptive end; (e) injecting a molten thermoplastic material into the mould cavity whereby the material flows into the entire mould cavity evenly coating the core of the climbing rung and weeping into the annular space between the receptive end of each preformed sleeve and the outside annular circumference of each leg and over the annular lip of the receptive end of each pre-formed sleeve and, whereby the injected thermoplastic material melds with the pre-formed sleeves to form a sealing interface.

3. An improved method of manufacturing an encapsulated climbing rung in a mould body having an ejection half and an injection half, the climbing rung having a generally U-shaped core of two parallel legs spaced apart by a central tread encapsulated in a protective coating, the coating including the combination in a sealing interface of (i) a pair of injection moulded protective sleeves encapsulating the portion of each leg extending from the end thereof to a position intermediate the end of each leg and the central tread, and (ii) an injection moulded protective coating; encapsulating the tread extending to the sealing interface proximate the annular end of each injection moulded protective sleeve remote from the end of each leg; the method comprising the steps of: (a) gripping with gripping means, alternately one portion and then an oppositely spaced portion of the core of the climbing rung remote a portion of the core to be positioned with the gripping means centrally in an injection mould cavity; (b) encapsulating one portion of the core of the climbing rung thus defining an annular encapsulated end thereof when the opposite portion of the climbing rung is gripped by remotely spaced gripping means, (c) then gripping the most recently encapsulated portion of the climbing rung and encapsulating the oppositely spaced portion of the core of the climbing rung, the later encapsulated portion melding in a sealing interface with the annular end of the previously encapsulated portion whereby by alternately gripping at least two oppositely spaced portions of the core of the climbing rung the entire core of the climbing rung is coated in an injection moulding process.

4. An improved method of manufacturing an encapsulated climbing rung in a mould body having an ejection half and an injection half, the climbing rung having a generally U-shaped core of two parallel legs spaced apart by a central tread encapsulated in a protective coating, the coating comprising the combination in a sealing interface of i) a pair of injection moulded protective sleeves encapsulating the portion of each leg extending from the end thereof to a position intermediate the end of each leg and the central tread, and ii) an injection moulded protective coating encapsulating the tread extending to the sealing interface proximate an annular end of each injection moulded protective sleeve remote from the end of each leg; the method comprising the steps of: (a) gripping the core of the climbing rung with means for gripping the climbing rung only remote the end of each leg; (b) positioning with the gripping means the end of each leg of the climbing rung extending only to proximate the portion of each leg remote the end of each leg centrally in a disjointed injection mould cavity; (c) closing the ejection half and the injection half of the mould body so as to form the mould cavity enclosing the end of each leg of the climbing rung extending only to the portion of each leg remote the end of each leg, the mould body remote the end of each leg forming an annular seal at the outside circumference of the core of each leg of the climbing rung; (d) injecting a molten material into the mould cavity enclosing the said end portion of each leg of the climbing rung whereby a pair of moulded protective sleeves are formed, each sleeve encapsulating the portion of each leg extending from the end thereof to the annular end of the sleeve at a position intermediate the end of each leg and the central tread; (e) ejecting the climbing rung comprising the injection moulded protective sleeves from the mould cavity and gripping the injection moulded protective sleeves with gripping means for gripping the climbing rung only proximate the end of each leg; (f) positioning, with the gripping means for gripping the climbing rung only proximate the end of each leg, and the tread centrally in an injection mould cavity; (g) closing the ejection half and the injection half of the mould body so as to form the mould cavity enclosing the tread and each leg of the climbing rung extending only to proximate The annular of each injection moulded protective sleeve, the mould body forming an annular seal at the outside circumference of each injection moulded protective sleeve proximate its annular end; (h) injecting the molten material into the mould cavity whereby the molten material flows into the mould cavity evenly encapsulating the core of the climbing rung comprising the central tread and each leg of the climbing rung extending to the annular end of each injection moulded protective sleeve and melding in a sealing interface with the annular end of each injection moulded protective sleeve.

5. An improved method of manufacturing an encapsulated climbing rung in a mould body having an ejection half and an injection half, the climbing rung having a generally U-shaped core of two parallel legs spaced apart by a central tread encapsulated in a protective coating, the coating comprising the combintion in a sealing interface of (i) a pair of injection moulded protective sleeves encapsulating the portion of each leg extending from the end thereof to a position intermediate the end of each leg and the central tread, and (ii) an injection moulded protective coating encapsulating the tread extending to the sealing interface proximate an annular end of each injection moulded protective sleeve remote from the end of each leg; the method comprising the steps of: (a) gripping the core of the climbing rung with means for gripping the climbing rung only proximate the end of each leg; (b) positioning with the gripping means the tread and each leg of the climbing rung extending only to proximate the portion of each leg remote the end of each leg cenrally in a disjointed injection mould cavity; (c) closing the ejection half and the injection half of the mould body so as to form the mould cavity enclosing the tread and each leg of the climbing rung extending only to provide the portion of each leg remote the end of each leg, the mould body forming an annular seal at the outside circumference of the core of each leg remote the end of each leg; (d) injecting a molten material into the mould cavity whereby the molten material flows into the mould cavity evenly encapsulating the core of the climbing rung comprising the central tread and the portion of each leg remote its end; (e) ejecting the climbing rung comprising the encapsulated tread and the portion of each leg remote its end from the mould cavity and gripping the encapsulated portion of the climbing rung with gripping means for gripping the climbing run only remote the end of each leg; (f) positioning with gripping means for gripping the climbing rung extending only to proximate the portion of each leg remote the end of each leg and proximate the injection moulded coating of the tread and the portion of each leg remote the end of the each leg centrally in an injection mould cavity; (g) closing the ejection half and the injection half of the mould body so as to form the mould cavity enclosing the end of each leg of the climbing rung extending only to proximate the portion of each leg remote the end of each leg, the mould body forming an annular seal at the outside circumference of the portion of the injection moulded coating remote the end of each leg; (h) injecting the molten material into the mould cavity enclosing the said end portion of each leg of the climbing rung whereby a pair of moulded protective sleeves are formed, each sleeve encapsulating the portion of each leg extending from the end thereof to the annular end of the coating remote the end of each leg and melding in a sealing interface with the annular end of the coating encapsulating each leg remote its end.

* * * * *